Patented Mar. 4, 1952

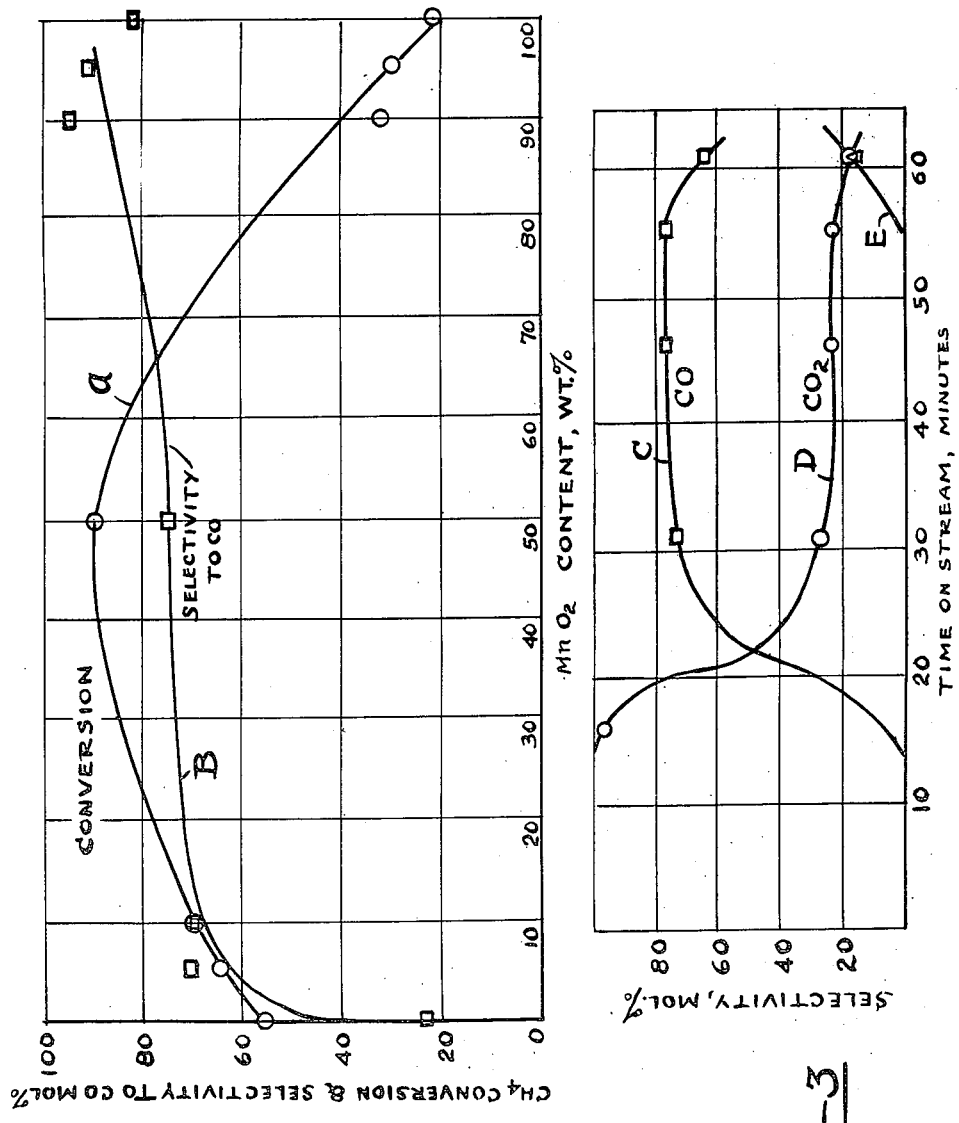

2,588,260

UNITED STATES PATENT OFFICE 2,588,260

OXIDATION CARRIER FOR THE OXIDATION OF HYDROCARBONS

Charles S. Lynch, Plainfield, and Eugene S. Corner, Maplewood, N. J., assignors to Standard Oil Development Company, a corporation of Delaware Original application August 12, 1947, Serial No. 768,247. Divided and this application January 26, 1950, Serial No. 140,646

3 Claims. (Cl. 252—186)

This application is a division of our copending application Serial No. 768,247, filed August 12, 1947, now Patent No. 2,553,551.

The present invention is directed to a method for producing industrial gases containing carbon monoxide and hydrogen from gaseous hydrocarbons and to novel compositions which function as oxygen carriers in the oxidation of gaseous hydrocarbons.

In many industrial processes the raw material is composed of, or essentially contains, a mixture of carbon monoxide and hydrogen. Chief among these processes are the so-called Methanol Synthesis, in which carbon monoxide and hydrogen are reacted in the presence of a suitable catalyst to produce oxygenated organic compounds, and the Fischer Tropsch Synthesis in which carbon monoxide and hydrogen in suitable proportions are reacted in the presence of a suitable catalyst and under selected conditions to produce a product primarily composed of liquid hydrocarbons. In processes of this type it is highly desirable that the feed gas be free from contamination with inert gaseous substances.

The obvious way to obtain a mixture of carbon monoxide and hydrogen is to subject a mixture of a hydrocarbon such as methane and air to controlled combustion. This procedure, however, results in a gas containing a large quantity of nitrogen. This detrimental dilution has led to much study and experimentation, directed toward the development of a method for producing the desired "make gas" free from contaminants and diluents.

Among the procedures which have been proposed for producing from hydrocarbons a suitable gas mixture containing carbon monoxide and hydrogen free from large volumes of diluent gas is that in which a metal is used as an oxygen carrier. The general procedure proposed is to react the hydrocarbon, such as methane, with a metal oxide until the latter is depleted in oxygen content, then to reoxidize the depleted metal carrier with air, venting off the residue gases and again reacting the regenerated oxide with the hydrocarbon. By this procedure the gas resulting from the reaction of the hydrocarbon with the metal oxide is obtained separately from the gaseous residues from the oxidation of the metal with air.

While a number of metals have been proposed for use in this process they all present different problems when it is attempted actually to use them in the process. Zinc oxide is one which theoretically should serve the purpose admirably because its oxidation potential is such that it is practically impossible to oxidize a hydrocarbon with zinc oxide to carbon dioxide whereby a high selectivity to carbon monoxide can be expected in the use of this metal oxide. Zinc oxide, however, presents the great difficulty that at the temperature at which it will give up its oxygen the zinc will also vaporize, giving rise to a difficult recovery problem. Moreover, at the temperature of operation, zinc oxide does not effect a sufficiently high conversion of the hydrocarbon.

Of the many oxides which might be considered useful, iron oxide, based on considerations of availability, price and reactivity with hydrocarbons, would seem to be the logical choice. When it is attempted, however, to react a hydrocarbon such as methane with a fixed bed of iron oxide, the course of the reaction proceeds in a direction quite the contrary of that desired. At the outset the iron oxide oxidizes the hydrocarbon completely to carbon dioxide until an appreciable quantity of free iron is present in the reaction mass. From that point on some carbon monoxide is produced but at the same time large quantities of carbon are produced by reason of the highly catalytic effect of the iron on the cracking of hydrocarbons.

It had been expected that this difficulty of controlling the course of the reaction between the hydrocarbons and iron oxide could be ameliorated by operating according to that technique which has come to be known as a fluidized solid technique in which the solid in finely divided form is suspended in a rising stream of the gas to be reacted while correlating the velocity of the gas with respect to the degree of fineness of the solid to produce a dense suspension of the solid in the gas in which the solid is in a highly turbulent state. The difficulty encountered with this procedure, however, is that when the temperature of operation is maintained within the limits calculated to give the desired rate of reaction, for example between about 1600 and 2000° F., the finely divided mixture of iron oxide and iron proves to be very difficult to fluidize. It appears that the powdered material becomes sticky in this range of temperatures, although it is considerably below the melting point of either the iron oxide or the iron, with the result that the particles agglomerate and do not remain in the desired state of suspension. This failure to remain fluidized appears to cause the reaction to follow substantially the same course as that observed in fixed bed operation.

According to the present invention, an efficient oxygen carrier for the oxidation of hydrocarbons is prepared by mixing manganese dioxide with iron oxide in such manner as to give a very intimate degree of mixing. The intimacy of admixture desired is comparable to that attainable by precipitating the mixed oxides from mixed water solutions of their salts. A comparable degree of mixing for the purpose of the present invention is attainable by soaking either of the oxides in a solution of the salt of the other and thereafter roasting. If desired, one of the oxides can be immersed in the water solution of a salt of the other, a precipitating agent added to precipitate the oxide of the other, and the resulting solid precipitate filtered, washed and roasted.

The preferred carrier, according to the present invention, is a mixture of $Fe_2O_3$ and $MnO_2$ containing between 10 and 70 parts by weight of $MnO_2$. The best composition is a 50-50 weight mixture of these compounds. Other iron oxides may be employed, if desired.

The oxygen carrier, according to the present invention, constitutes a marked improvement over iron oxide as an oxygen carrier both in fixed bed operation and in operation according to the so-called fluidized solid technique in which the oxygen carrier in finely divided form is suspended in the form of a dense, turbulent suspension in a rising stream of the hydrocarbon gas. In the fixed bed type of operation the compound oxygen carrier makes possible the realization of a degree of conversion and a selectivity of the reaction toward the production of carbon monoxide and hydrogen unexpectedly superior to that attainable by the use of either component of the compound carrier alone. In the fluidized solid type of operation there is secured, in addition to the foregoing advantages, considerably increased fluidizability at the temperatures of operation, which are usually between about 1600° F. and 2000° F. It will be understood that the upper limit of this temperature may be higher and is dictated only by the melting point of the finely divided solid and the material of which the reaction vessel is made.

Furthermore, the compound carrier makes possible an operation at a high conversion level with high selectivity to carbon monoxide for an extended period of time indicating that there is no critical oxygen content of the compound carrier but that it is effective over a fairly wide range of oxygen content. This is important commercially because in a two-stage operation, in one stage of which the hydrocarbon is reacted with the oxygen carrier and in the other stage of which the oxygen content of the carrier is replenished by treatment with an oxidizing agent such as air, much less careful control is required in both stages. Finally it is to be observed that the foregoing advantages are realized in both fixed bed and fluidized solid operations with a minimum production of carbon.

In one particular embodiment of the present invention, namely that in which the fluidized solid technique is employed, the fluidizing character of the solid is improved by incorporating in it varying amounts of magnesia and/or chromium oxide which may be included in the composition of the oxygen carrier by coprecipitation with the components of the carrier. From 10 to 40% by weight of the magnesia and/or chromium oxide may be advantageously included in the composition to improve fluidizing characteristics and in some instances to improve conversion and selectivity.

The nature of the present invention will be more fully understood from the following detailed description of the accompanying drawing in which:

Fig. 2 is a pair of curves showing the relationship between hydrocarbon conversion and selectivity to carbon monoxide with compound carriers according to the present invention with varying contents of manganese oxide; and Fig. 3 is a family of curves showing the variation in selectivity of a 50-50 mixture of iron oxide and manganese oxide with time of operation.

Figure 1:
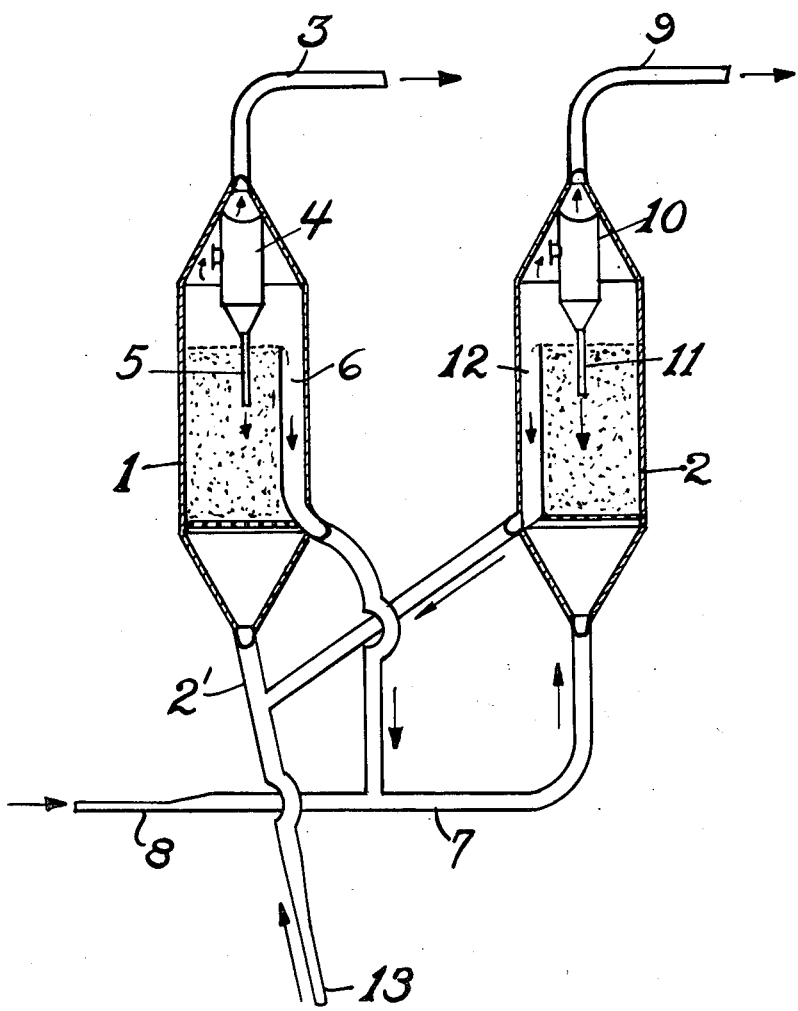
Fig. 1 is a front elevation in diagrammatic form of one type of apparatus suitable for the practice of the present invention.

Referring to the drawing in detail, numeral 1 designates a reaction vessel and numeral 2 designates a regeneration vessel. In the embodiment shown these vessels operate on the dense phase drawoff principle. It will be understood that these vessels can be of the well known bottom drawoff type or the strictly upflow type.

Vessel 1 is provided at its bottom with an inlet 2' for gas and finely divided solid and at its upper end with an outlet 3 for gas, ahead of which is an internal cyclone 4 or other separator for gases and solids having a dip leg 5 depending into the vessel. On one wall the vessel is provided with a duct 6 having its open upper end terminating at the selected level for the dense phase of the suspension. This duct empties into a line 7 into which air or other oxidizing gas is fed through line 8. Line 7 discharges into the bottom of vessel 2 which, like vessel 1, is provided at its upper end with a gas vent 9 ahead of which is arranged a cyclone separator 10 having a dip leg 11 extending into the dense phase of the suspension in vessel 2. Vessel 2 is also provided with a duct 12 on one of its walls having its open upper end located at the intended level of the dense phase of the suspension in vessel 2. Duct 12 empties into line 2' into which is fed a hydrocarbon gas through line 13.

In carrying out the process of the present invention in the apparatus described, the vessels are charged with finely divided solid the individual particles of which are an intimate mixture of manganese oxide and iron oxide with or without other fluidizing additions. As previously indicated, this mixture is conveniently prepared by mixing aqueous solutions of a manganese salt and an iron salt and coprecipitating the hydroxides with an alkali. The precipitate is carefully washed to remove water-soluble contaminants after which it is dried and roasted. If the final product is not in the finely divided form heretofore specified, it is ground so as to satisfy the requirements.

In starting up with both vessels charged with the finely divided solid mentioned above, the system may be brought to a temperature between about 1550 and 1850° F. by feeding hot combustion gases through lines 8 and 13. If desired, some finely divided carbon may be mixed with the initial charge and the system brought to temperature by burning off the carbon. When the operating temperature is obtained, a hydrocarbon gas is fed through line 13 at a velocity such as to maintain the finely divided solid in vessel 1 in suspension in the gas in the form of a dense body in which the particles are in incessant motion. The velocity should be so regulated as to produce a suspension having at least about 5% by volume of solids, preferably between about 10 and 25%. The velocity is correlated with the amount of solids charged so as to bring the level of the dense phase to a point where it overflows into conduit 6. The gases passing out of the vessel tend to carry solids with them. These solids are separated in the cyclone 4 and returned to the dense suspension.

As the solid overflows into conduit 6 and thus into line 7, preheated air or other oxidizing medium is fed in through line 8 at a velocity such as to carry the finely divided solid into vessel 2 and maintain it therein in a suspension of the character heretofore described, the level of the dense phase of the suspension being so regulated that the dense phase overflows into conduit 12 which carries solid back into line 2'.

The heat required for the reaction in vessel 1 is supplied primarily as sensible heat contained in the solids returned from vessel 2 supplemented by preheat imparted to the hydrocarbon gas from the hot exhaust gas from vessel 2.

It will be appreciated that the illustration of the apparatus and the drawing is limited to the bare essentials, calculated merely to depict the flow plan of the process. Design and engineering details are purposely omitted to avoid unnecessary complication. Among such details are heat exchangers, aerating jets for the various conduits, pumps, and the like. It is repeated that the flow plan shown is only one of several which may be used, the essential requirement being that the flow plan shall include at least two zones in one of which hydrocarbon is reacted with iron oxide and in the other of which iron with depleted oxygen content is treated with an oxidizing gas so as to replenish its oxygen content.

Referring to Fig. 2, curve A shows the variation in conversion of methane at 1700° F. in a fixed bed reactor with a methane feed rate of 100 v./v./hr. with compound carriers according to the present invention with varying contents of manganese oxide. Curve B shows the variation in selectivity to CO under the same conditions with the same variations in content of $MnO_2$. The data on the runs on which these curves are based are as follows:

*Methane oxidation with $Fe_2O_3$-$MnO_2$ compositions*

[Fixed bed; 1700° F.; 100 v./v./hour.]

| $MnO_2$ Content, Weight per cent.. | 0 | 10 | 50 | 90 | 100 |
|---|---|---|---|---|---|
| Methane Conversion, per cent | 56 | 70 | 90 | 32 | 22 |
| Selectivity, Mol per cent: | | | | | |
| CO | 22 | 70 | 75 | 95 | 82 |
| $CO_2$ | 78 | 30 | 25 | 5 | 8 |
| C | 0 | 0 | 0 | 0 | 10 |

It will be observed that under the conditions of operation iron oxide alone gave a conversion of 56% with a selectivity to CO of 22%. 10% of manganese oxide increased the conversion to 70% and the selectivity to 70%. Maximum conversion was obtained with a 50-50 mixture of iron oxide and manganese oxide with a selectivity to CO of 75%. As the iron oxide decreased below 50% the selectivity tended to rise but the conversion fell off rapidly. Manganese oxide alone gave a conversion of only 22%. It will be apparent that over a wide variation of composition both conversion and selectivity were maintained at a high level.

Referring to Fig. 3, curve C shows the variation of selectivity to carbon monoxide with time on stream when using a 50-50 mixture of $Fe_2O_3$ and $MnO_2$ in a fixed bed reactor at 1700° F. with a methane feed rate of 100 v./v./hr. Curve D shows for the same operations the variation in selectivity to $CO_2$ with time while curve E shows the point at which carbon production begins and its increase with time. The data from which these curves were prepared were as follows:

*Methane oxidation with $50Fe_2O_3$-$50MnO_2$*

[Fixed bed; 1700° F.; 100 v./v./hr.]

| Time on Steam, Min | 15 | 30 | 55 | 60 |
|---|---|---|---|---|
| Methane Conversion, per cent | 100 | 70 | 94 | 98 |
| Selectivity, Mol per cent: | | | | |
| CO | 1 | 72 | 76 | 66 |
| $CO_2$ | 99 | 28 | 24 | 18 |
| C | 0 | 0 | 0 | 16 |

It will be observed first of all that there is a relatively short induction period in which product gas changes from 100% $CO_2$ to a relatively high percentage of CO. This high selectivity to CO persisted in the particular operation described for a period of about 25 minutes when it began to drop off simultaneously with the formation of carbon as shown in curve E. This period of high selectivity to CO with no carbon formation indicates the high degree of utility of the oxygen carrier for commercial operations. In a continuous operation as heretofore described it is relatively easy to operate so as to limit the residence time of the oxygen carrier in the methane conversion zone to less than 25 minutes. A wide variation in residence time is permissible without any substantial effect on the composition of the product gas and without any formation of carbon. This, of course, indicates that the oxygen carrier is effective in producing the desired results over a wide range of oxygen content in the carrier. Thus, with the use of the oxygen carrier in the present invention much less careful control of residence time of the carrier in the reactor and the degree of reoxidation of the carrier in the regenerating zone is required.

In order to demonstrate the effectiveness of the composite carrier in a fluidized type operation, a 50-50 mixture of $FeO_2O_3$ and $MnO_2$ prepared by impregnation of $Fe_2O_3$ with a water solution of manganese nitrate followed by drying and calcining of the impregnated iron oxide was employed in finely divided form in a fluidized operation in which methane was oxidized. In this operation the finely divided solid was continuously maintained in the reaction zone, the velocity of the methane upwardly through the mass of finely divided solid being sufficient to maintain the finely divided material in a dense turbulent suspension. The reaction zone was maintained at a temperature of 1700° F. and the feed rate of the methane was regulated at a value of 200 v./v./hr. The date obtained were as follows:

*Methane oxidation with 50 $Fe_2O_3$-$50MnO_2$*

[Fluid bed operation; 1700° F.; 200 v./v./hr.]

| Time of Stream, Min | 28 | 35 | 42 | 45 |
|---|---|---|---|---|
| Fluidization | (¹) | (¹) | (²) | (²) |
| Selectivity, Mol per cent: | | | | |
| CO | 78 | 82 | 86 | 89 |
| $CO_2$ | 22 | 18 | 14 | 11 |
| C | 0 | 0 | 0 | 0 |

¹ Good.
² Channeling observed.

In this operation it will be observed that high selectivity was maintained to the end of the run, which was 45 minutes in duration. Furthermore, it will be observed that no carbon formation had begun at the end of the run. After 35 minutes of operation, the fluidization, which up to that time had been excellent, began to show signs of impairment as indicated by the tell-tale occurrence of channeling. It will be understood, however, that in a continuous operation of the type illustrated in the drawing the residence time of the oxygen carrier in the reaction zone can readily be controlled so as to be less than 45 minutes. The channeling was presumably due to decrease in oxygen content of the carrier below the desired level. The important fact revealed by this data is that the oxygen carrier of the present invention performs better in the fluidized type of operation than in a fixed bed type of operation.

In order to illustrate the nature of the improvement effected by the joint use of magnesia or chromium oxide with the iron oxide-manganese oxide carrier, runs were made employing the fluidized solid technique with three-component carriers of these types. In the following table are given the operating conditions and the results:

*Methane oxidation with metal oxides*

[200 v./v./hr.; 1½" quartz reactor; fluid bed operation.]

| Oxide Composition | 38 $Fe_2O_3$-45 $MnO_2$-17 MgO | | | 45 $Fe_2O_3$-45 $MnO_2$-10 MgO | | | 45 $Fe_2O_3$-45 $MnO_2$-10 $Cr_2O_3$ |
|---|---|---|---|---|---|---|---|
| Time on Stream, Min | 54 | 62 | 71 | 43 | 50 | 62 | 29 |
| Methane Conversion, per cent | 56 | 83 | 94 | 62 | 73 | 91 | 96 |
| Selectivity, Mol per cent: | | | | | | | |
| CO | 90 | 90 | 89 | 89 | 90 | 91 | 83 |
| $CO_2$ | 10 | 10 | 8 | 11 | 10 | 9 | 17 |
| C | 0 | 0 | 3 | 0 | 0 | 0 | 0 |

These data indicate that excellent results can be obtained by the utilization of these three component mixtures. Both the methane conversion and selectivity were high and carbon formation did not occur over long periods of operation. These oxygen carriers gave the best results thus far attainable in an operation of this type.

Although in the foregoing the specific operation described employs the fluidized solids technique, it is to be understood that in the practice of the present invention a fixed bed or a combination of fixed bed and a fluidized solid bed may be employed. In general, the temperature in the hydrocarbon oxidation zone is maintained in the range between about 1600° F. and 2000° F. The pressure may be atmospheric or superatmospheric, depending on design and economic considerations. Pressures as high as 600 lbs./sq. in. are contemplated. The feed rate of the hydrocarbon gas may vary widely, depending on other operating conditions. In general, permissible feed rates will be higher the higher the operating temperature and pressure. Feed rates as low as 100 volumes of gas per volume of oxygen carrier per hour are contemplated and this feed rate may be as high as 3000 v./v./hr. The residence time of the oxygen carrier in the hydrocarbon oxidation zone will vary and is a function of the circulation rates required for temperature control between the reactor and the regenerator. This residence time is also a function of the average oxygen to metal ratio in the oxygen carrier at which high selectivities for CO production are obtained. This residence time may vary from about 5 to 30 minutes. In general, it is preferred to have a residence time of the oxygen carrier in the hydrocarbon oxidation zone in the range of about 10 to 15 minutes.

The nature and objects of the present invention having been described and illustrated, what is claimed as new and useful and is desired to be secured by Letters Patent is:

1. An oxygen carrier for the oxidation of hydrocarbons to a gas containing carbon monoxide and hydrogen consisting essentially of approximately equal gravimetric proportions of iron oxide and manganese oxide and also containing about 10 to 40 weight per cent of a metal oxide selected from the class consisting of magnesia and chromium oxide, compounded by coprecipitation of the said oxides from mixed aqueous solutions of their salts.

2. An oxygen carrier adapted to oxidize hydrocarbons to a gas containing carbon monoxide and hydrogen consisting essentially of approximately equal gravimetric proportions of iron oxide and manganese oxide and also containing about 10 weight per cent of magnesia, based on the total catalyst.

3. An oxygen carrier adapted to oxidize hydrocarbons to a gas containing carbon monoxide and hydrogen consisting essentially of approximately equal gravimetric proportions of iron oxide and manganese oxide and also containing about 10 weight per cent of chromium oxide, based on the total catalyst.

CHARLES S. LYNCH.
EUGENE S. CORNER.

REFERENCES CITED

The following references are of record in the file of this patent:

UNITED STATES PATENTS

| Number | Name | Date |
|---|---|---|
| 2,180,672 | Frey | Nov. 21, 1939 |
| 2,258,111 | Engel | Oct. 7, 1941 |